United States Patent
Bon et al.

(10) Patent No.: US 12,427,937 B2
(45) Date of Patent: Sep. 30, 2025

(54) METHOD OF CONTROLLING AN AUXILIARY SYSTEM OF A TRANSPORTATION VEHICLE

(71) Applicant: Volvo Truck Corporation, Gothenburg (SE)

(72) Inventors: Philippe Bon, St Bonnet de Mure (FR); Yann Quibriac, Lyons (FR)

(73) Assignee: Volvo Truck Corporation, Gothenburg (SE)

( * ) Notice: Subject to any disclaimer, the term of this patent is extended or adjusted under 35 U.S.C. 154(b) by 238 days.

(21) Appl. No.: 18/319,590

(22) Filed: May 18, 2023

(65) Prior Publication Data

US 2023/0382324 A1 Nov. 30, 2023

(30) Foreign Application Priority Data

May 27, 2022 (EP) ..................................... 22175831

(51) Int. Cl.
*B60R 16/023* (2006.01)
*B60H 1/00* (2006.01)
*B60N 2/00* (2006.01)
*B60P 1/54* (2006.01)
(Continued)

(52) U.S. Cl.
CPC ....... *B60R 16/0231* (2013.01); *B60H 1/0073* (2019.05); *B60N 2/002* (2013.01); *B60P 1/5423* (2013.01); *B60Q 1/2607* (2013.01); *B60Q 1/2661* (2013.01); *B60Q 1/32* (2013.01)

(58) Field of Classification Search
CPC .............. B60R 16/0231; B60H 1/0073; B60H 1/00828; B60H 1/00878; B60H 1/00742; B60N 2/002; B60P 1/5423; B60Q 1/2607; B60Q 1/2661; B60Q 1/32; B66C 23/42; B66C 23/54; B66C 23/88
See application file for complete search history.

(56) References Cited

U.S. PATENT DOCUMENTS

| 9,434,275 B2 * | 9/2016 | Maley ..................... B60N 2/267 |
| 10,196,068 B2 | 2/2019 | Yoo |
| 10,448,628 B2 | 10/2019 | Brooks |

(Continued)

FOREIGN PATENT DOCUMENTS

| FR | 3106913 A1 | 8/2021 |
| GB | 2523198 A | 8/2015 |

OTHER PUBLICATIONS

Extended European Search Report for European Patent Application No. 22175831.1, mailed Nov. 25, 2022, 11 pages.

*Primary Examiner* — Abdalla A Khaled
(74) *Attorney, Agent, or Firm* — Withrow & Terranova, PLLC (57) ABSTRACT

A computer implemented method of controlling an auxiliary system of a transportation vehicle, the method comprising determining, by a processing circuitry, manual actuation of a start actuator of the vehicle for a predetermined duration; determining, by the processing circuitry, a driver seat state of a driver seat of the vehicle as being occupied or not occupied; determining, by the processing circuitry, a door state of a driver side door of the vehicle as being open or closed; and controlling, by the processing circuitry, operation of the auxiliary system according to a predetermined set of rules based on the driver seat state and the door state.

14 Claims, 6 Drawing Sheets

(51) Int. Cl.
    *B60Q 1/26*          (2006.01)
    *B60Q 1/32*          (2006.01)

(56) References Cited

U.S. PATENT DOCUMENTS

| | | |
|---|---|---|
| 10,606,378 B2 | 3/2020 | Rao et al. |
| 11,292,314 B2 * | 4/2022 | Lee .................... B60H 1/00742 |
| 11,436,909 B2 * | 9/2022 | Clemmons-Trigueros .................. G08B 21/24 |
| 2013/0049946 A1 * | 2/2013 | Chavez .................... B60Q 1/00 340/457 |
| 2017/0057511 A1 * | 3/2017 | Woodley ............... B60W 10/04 |
| 2017/0101110 A1 * | 4/2017 | Yoo ....................... B60W 10/20 |
| 2018/0274465 A1 * | 9/2018 | Brooks .................. B60N 2/002 |
| 2018/0373350 A1 | 12/2018 | Rao et al. |
| 2020/0167116 A1 | 5/2020 | Manabe et al. |
| 2021/0114485 A1 * | 4/2021 | Ito ........................... G06V 20/00 |
| 2021/0209927 A1 * | 7/2021 | Hedges ................ G08B 25/005 |
| 2022/0009506 A1 * | 1/2022 | Nakaoka .................. G06N 7/01 |
| 2022/0024309 A1 * | 1/2022 | Seo ...................... B60K 28/063 |
| 2022/0185170 A1 * | 6/2022 | Salter .................. H05B 47/115 |

\* cited by examiner

METHOD OF CONTROLLING AN AUXILIARY SYSTEM OF A TRANSPORTATION VEHICLE

RELATED APPLICATIONS

The present application claims priority to European Patent Application No. 22175831.1, filed on May 27, 2022, and entitled "METHOD OF CONTROLLING AN AUXILIARY SYSTEM OF A TRANSPORTATION VEHICLE," which is incorporated herein by reference in its entirety.

TECHNICAL FIELD

The present disclosure relates to auxiliary system controls. In particular, the present disclosure relates to controlling an auxiliary system of a transportation vehicle. The disclosure is applicable on transportation vehicles, in particular medium- and heavy duty vehicle. Although the inventive concept will be described with respect to a heavy duty vehicle in the form of a truck, the disclosure is not restricted to this particular transportation vehicle, but may also be used in other transportation vehicles.

BACKGROUND

To start up the propulsion motor of a transportation vehicle, a start button is conventionally pushed. The operator of the vehicle also needs to have the vehicle key with him, such as in the pocket, to initiate activation of the propulsion motor. In further detail, when the operator pushes the start button, a signal is transmitted to e.g., a start engine for an internal combustion engine, whereby the internal combustion engine initiates its combustion process in an idle operation mode.

The propulsion motor may also be an electric machine, in which an activation signal is sent to the electric machine upon actuation of the start button. The electric machine is hereby activated and prepared for propelling the vehicle once the operator pushes e.g., the accelerator pedal.

After the propulsion motor has been activated, the operator can choose to activate an auxiliary system of the transportation vehicle. For example, the operator can choose to activate the windshield wiper system if it is rainy, activate or control an air condition system, open or close windows of the transportation vehicle, etc.

However, all these auxiliary systems of the transportation vehicle need to be controlled manually after the propulsion motor has been activated. There is thus a desire to improve the support of auxiliary system control for the operator of the vehicle.

SUMMARY

It is thus an object of the present disclosure to at least partially overcome the above described deficiencies.

According to a first aspect, there is provided a computer implemented method of controlling an auxiliary system of a transportation vehicle, the method comprising: determining, by a processing circuitry, manual actuation of a start actuator of the vehicle for a predetermined duration; determining, by the processing circuitry, a driver seat state of a driver seat of the vehicle as being occupied or not occupied; determining, by the processing circuitry, a door state of a driver side door of the vehicle as being open or closed; and controlling, by the processing circuitry, operation of the auxiliary system according to a predetermined set of rules based on the driver seat state and the door state.

The expression "processing circuitry" as used above should be understood to include any type of computing device, such as an ASIC, a micro-processor, etc. It should also be understood that the actual implementation of such a processing circuitry may be divided between more than a single device/circuit.

The above described predetermined time period should be construed as a time period more extensive than a simple quick push on the start actuator. The predetermined time period is preferably longer than 0.5-1 seconds, and more preferably up to at least two seconds.

Further, the auxiliary system may comprise a wide variety of vehicle auxiliaries as will be evident from the below description of various examples. However, the propulsion motor of the transportation vehicle should not be construed as falling within the definition of an auxiliary system.

The present disclosure is based on the insight that improved support for the operator of the vehicle is provided by controlling an auxiliary system based on the driver seat state and the door state when the start actuator is manually actuated. In detail, based on if the driver seat is occupied or not, and the driver side door is open or closed, a suitable auxiliary system for the specific situation is controlled without the need for the operator to take a manual action. The operator of the vehicle is hereby supported in a better way in his/her mission, whereby the operator can fully focus on the upcoming mission and not having to take action to prepare the various vehicle auxiliaries before taking off.

According to an example, the auxiliary system may be controlled according to a first predetermined rule when the driver seat is occupied, and the driver side door is open or closed. The first predetermined rule is thus based on the fact that the operator is sitting in the driver seat when the start actuator is actuated. Hence, when the operator is sitting in the driver seat, the auxiliary system is preferably controlled according to the first predetermined rule irrespective of the door state, i.e., whether the door is closed or still open.

According to an example, the auxiliary system may be controlled according to a second predetermined rule when the driver seat is not occupied, and the driver side door is closed. Hereby, a passenger of the vehicle, which passenger is not the operator of the vehicle, may push the start actuator while e.g., waiting for the operator to enter the vehicle, whereby the auxiliary system is controlled according to the second predetermined rule. Another example is when the operator is sitting at a rear seat and leans to push the start actuator in order to control operation of the auxiliary system according to the second predetermined rule.

According to an example, the auxiliary system is a temperature control system of the vehicle, the temperature control system being controlled based on an ambient temperature of the vehicle when controlled according to the first and/or second predetermined rules. Since the operator, or at least a passenger, is occupying the vehicle, controlling the temperature control system is beneficial to rapidly achieve a desired temperature of e.g., the propulsion motor and/or the cabin occupying the operator/passenger.

According to an example, the temperature control system may comprise an engine and cabin heater, the engine and cabin heater being controlled, by the processing circuitry, to heat a propulsion motor of the vehicle and a cabin of the vehicle when the ambient temperature is below a first predetermined threshold temperature limit.

The propulsion motor may, for example, be an internal combustion engine, an electric traction motor, a hydrogen combustion engine, etc.

Hereby, when it is relatively cold outside, such as e.g., below 16 degrees Celsius, the propulsion motor can be heated upon actuation of the start actuator. The propulsion motor will hereby reach a desired operating temperature more rapidly, and the cabin will rapidly reach a comfortable temperature for the operator when subsequently driving the vehicle.

According to an example, the temperature control system may comprise a cabin ventilation system for ventilating the cabin, the cabin ventilation system being controlled, by the processing circuitry, to ventilate the cabin of the vehicle when the ambient temperature is above the first predetermined threshold temperature limit and below a second predetermined threshold temperature limit, wherein the second predetermined threshold temperature limit is higher than the first predetermined threshold temperature limit.

As is evident from the above, the temperature control system can be controlled differently based on the ambient temperature. Hence, when the ambient temperature is between the first and second predetermined threshold temperature limits, i.e., higher than the first temperature threshold limit, it may not be fully necessary to heat the propulsion motor and cabin, but to rather ventilate the cabin to achieve a comfortable temperature level in the cabin.

According to an example, the temperature control system may comprise a cabin air conditioning system, the cabin air conditioning system being controlled, by the processing circuitry, to air condition the cabin of the vehicle when the ambient temperature is above the second predetermined threshold temperature limit. The temperature control system is here controlling the cabin air conditioning system when the ambient is higher than the second predetermined temperature threshold limit. The cabin air conditioning system can control the temperature level within the cabin more rapidly compared to the cabin ventilation system.

By controlling the temperature control system based on the ambient temperature, a correct action can be taken to control the temperature of either or both of the propulsion motor and the cabin.

According to an example, the method may further comprise controlling, by the processing circuitry, open windows of the vehicle to be closed when the ambient temperature is above the second predetermined threshold temperature limit. Hereby, the cabin air conditioning system can be operated more efficiently.

According to an example, the auxiliary system may be controlled according to a third predetermined rule when the driver seat is not occupied and when the driver side door is open.

The third predetermined rule can be implemented in a situation where the operator is standing on the ladder to the cabin and leans in to actuate the start actuator. In such situation, the operator may not intend to immediately initiate the mission, but to activate a suitable auxiliary system.

According to an example, the auxiliary system may comprise an external vehicle light system of the vehicle, the external vehicle light system comprising at least one external vehicle light source, the external vehicle light system being controlled, by the processing circuitry, to turn on the at least one external vehicle light source when controlled according to the third predetermined rule. Thus, the operator of the vehicle can hereby, after having leaned into the cabin compartment and actuated the start actuator, check the external vehicle light system such that it is fully operational.

According to an example, the at least one external vehicle light source may be a direction indicator lamp of the transportation vehicle.

According to an example, the auxiliary system may comprise a bodybuilder equipment of the transportation vehicle, the bodybuilder equipment being activated, by the processing circuitry, when controlled according to the third predetermined rule.

This is particular advantageous since the bodybuilder can be activated and ready for operation when the operator has leaned into the cabin and actuated the start actuator. Hence, when the operator subsequently arrives at the bodybuilder, there is no need to activate the bodybuilder since this has been done already at an earlier stage.

According to a second aspect, there is provided a system for controlling an auxiliary system of a transportation vehicle, the system comprising a driver seat sensor, a door sensor, a manually actuatable start actuator, and a control unit comprising processing circuitry coupled to the driver seat sensor, the door sensor and the start actuator, the processing circuitry being configured to receive a signal indicative of a manual actuation of the start actuator for a predetermined duration; receive a signal from the driver seat sensor, the signal being indicative of a driver seat state of a driver seat of the vehicle as being occupied or not occupied; receive a signal from the door sensor, the signal being indicative of a driver door state of the driver side door of the vehicle as being open or closed; and control operation of the auxiliary system according to a predetermined set of rules based on the driver seat state and the driver door state.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The signal indicative of a manual actuation of the start actuator should, throughout the entire description, be construed either an analog signal or a signal encoding data which is received by the processing circuitry. In a similar vein, the signal indicative of the driver seat state as well as the signal indicative of the door state should also be construed as either analog signals or signals encoding data which are received by the processing circuitry from the driver seat sensor and the door sensor, respectively.

According to an example, the manually actuatable start actuator may be configured to, upon actuation for the predetermined duration, transmit a motor start-up signal to a propulsion motor of the vehicle.

Effects and features of the second aspect are largely analogous to those described above in relation to the first aspect.

According to a third aspect, there is provided a transportation vehicle comprising a system according to any one of the examples described above in relation to the second aspect.

According to a fourth aspect, there is provided a computer program comprising program code means for performing the method of any of the examples described above in relation to the first aspect when the program is run on a computer.

According to a fifth aspect, there is provided a non-transitory computer readable medium carrying a computer program comprising program code for performing the method of any of the examples described above in relation to the first aspect when the program product is run on a computer.

According to a sixth aspect, there is provided a control unit for controlling an auxiliary system of a transportation vehicle, the control unit being configured to perform the method according to any one of the examples described above in relation to the first aspect.

Effects and features of the third, fourth, fifth and sixth aspects are largely analogous to those described above in relation to the first and second aspects.

Further features of, and advantages with, the present disclosure will become apparent when studying the appended claims and the following description. The skilled person realizes that different features of the present disclosure may be combined to create examples other than those described in the following, without departing from the scope of the present disclosure.

BRIEF DESCRIPTION OF THE DRAWINGS

The above, as well as additional objects, features, and advantages of the present disclosure, will be better understood through the following illustrative and non-limiting detailed description of exemplary examples of the present disclosure, wherein.

DETAIL DESCRIPTION

The present disclosure will now be described more fully hereinafter with reference to the accompanying drawings, in which exemplary examples are shown. The disclosure may, however, be embodied in many different forms and should not be construed as limited to the examples set forth herein; rather, these examples are provided for thoroughness and completeness. Like reference character refer to like elements throughout the description.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

Figure 1:
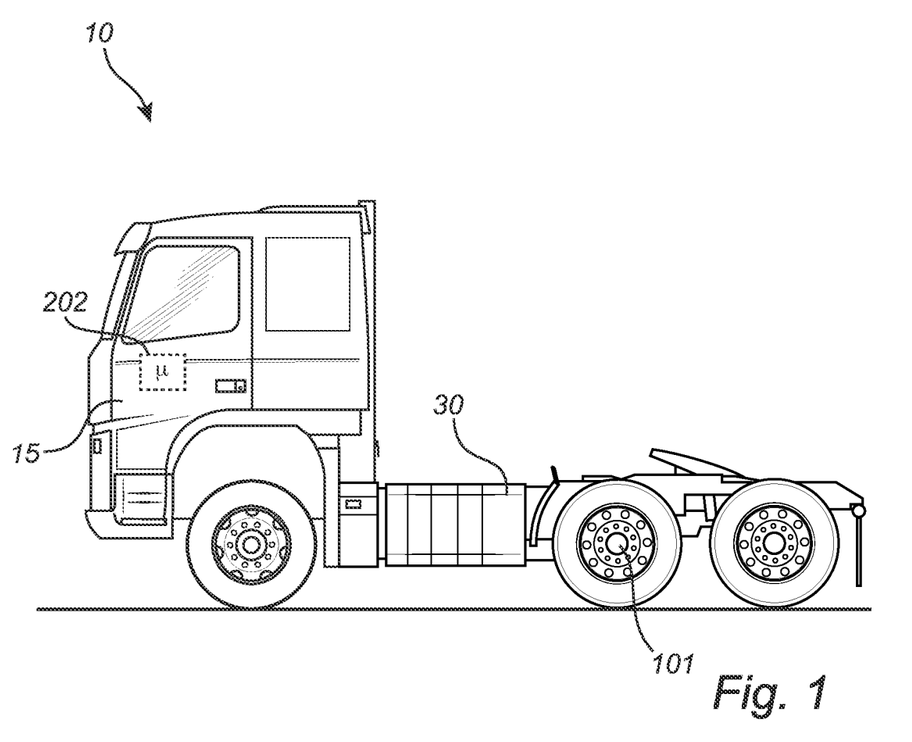
FIG. 1 is lateral side view of a transportation vehicle in the form of a truck according to an example.

With particular reference to FIG. 1, there is depicted a transportation vehicle 10 in the form of a truck. The transportation vehicle will in the following merely be referred to as a vehicle. The vehicle 10 comprises a cabin 15 from which the operator controls the vehicle. The vehicle also comprises a propulsion motor 101 for propelling the wheels of the vehicle. In FIG. 1, the truck is depicted as driven on the second pair of wheels as seen from the front end of the vehicle, but it should be readily understood that the disclosure is equally applicable for a front wheel driven truck, or an all-wheel drive truck, etc. The propulsion motor 101 is in the example an electric traction motor in the form of an electric machine, which is arranged to receive electric power from an energy storage system 30. It should however be understood that the propulsion motor 101 may equally as well be an internal combustion engine. The vehicle 10 also comprises a control unit 202 for controlling various operations as will also be described in further detail below, and at least one auxiliary system configured to operate an auxiliary function. The at least one auxiliary system and its operation will be described in further detail below with reference to the description of FIGS. 3-6.

Figure 2:
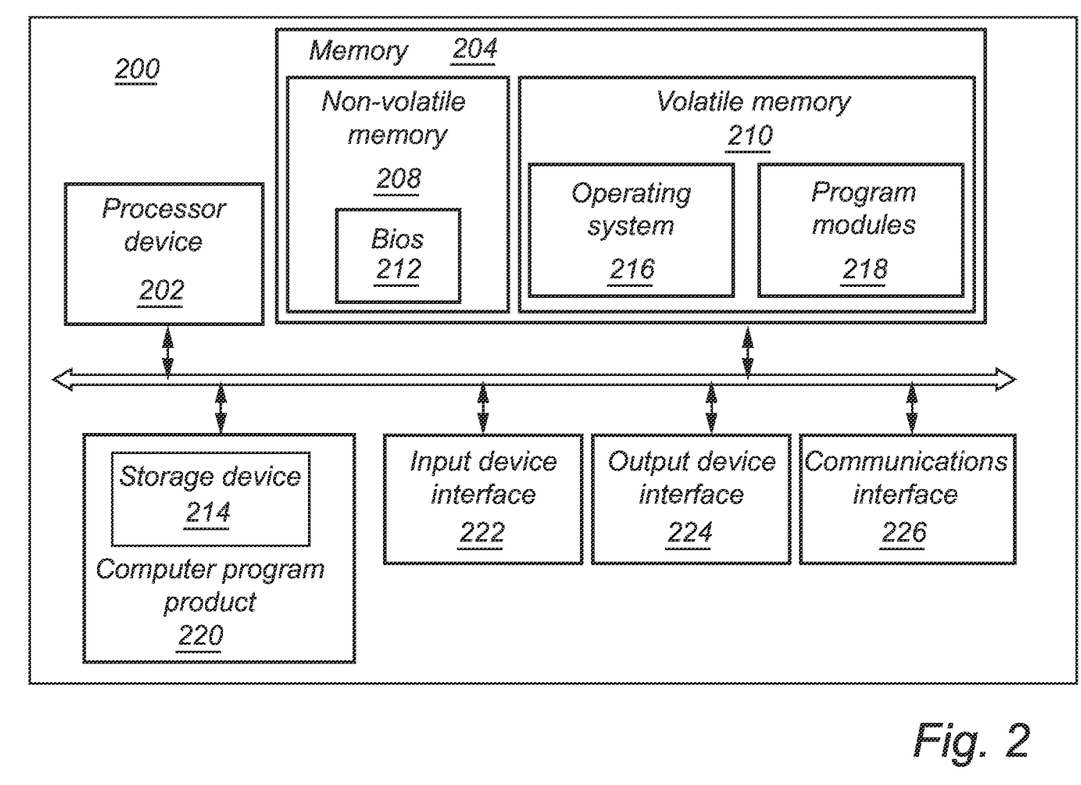
FIG. 2 is a schematic illustration of a computer system according to an example.

Turning now to FIG. 2, is a schematic illustration of a computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN, an intranet, an extranet, or the Internet. While only a single device is illustrated, the computer system 200 may include any collection of devices that individually or jointly execute a set (or multiple sets) of instructions to perform any one or more of the methodologies discussed herein.

The computer system 200 may comprise any computing or electronic device capable of including firmware, hardware, and/or executing software instructions to implement the functionality described herein. The computer system 200 includes the above described control unit 202, in the following also referred to as a processor device 202, a memory 204, and a system bus 206. The system bus 206 provides an interface for system components including, but not limited to, the memory 204 and the processor device 202. The processor device 202 may include any number of hardware components for conducting data or signal processing or for executing computer code stored in memory 204. The processor device 202 (i.e., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 206 may be any of several types of bus structures that may further interconnect to a memory bus (with or without a memory controller), a peripheral bus, and/or a local bus using any of a variety of bus architectures. The memory 204 may be one or more devices for storing data and/or computer code for completing or facilitating methods described herein. The memory 204 may include database components, object code components, script components, or other types of information structure for supporting the various activities herein. Any distributed or local memory device may be utilized with the systems and methods of this description. The memory 204 may be communicably connected to the processor device 202 (e.g., via a circuit or any other wired, wireless, or network connection) and may include computer code for executing one or more processes described herein. The memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)), or any other medium which can be used to carry or store desired program code in the form of machine-executable instructions or data structures, and which can be accessed by a computer or other machine with a processor device 202. A basic input/output system (BIOS) 212 may be stored in the non-volatile memory 208 and can include the basic routines that help to transfer information between elements within the computing device 200.

The computing device 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

A number of modules can be stored in the storage device 214 and in the volatile memory 210, including an operating system 216 and one or more program modules 218, which may implement the functionality described herein in whole or in part. All or a portion of the examples disclosed herein may be implemented as a computer program product 220 stored on a transitory or non-transitory computer-usable or computer-readable storage medium (i.e., single medium or multiple media), such as the storage device 214, which includes complex programming instructions, such as complex computer-readable program code, to cause the processor device 202 to carry out the steps described herein. Thus, the computer-readable program code can comprise software instructions for implementing the functionality of the examples described herein when executed by the processor device 202. The processor device 202 may serve as a controller, or control system, for the computing device 200 that is to implement the functionality described herein.

The computer system 200 also may include an input device interface 222 (e.g., input device interface and/or output device interface). The input device interface 222 may be configured to receive input and selections to be communicated to the computer system 200 when executing instructions, such as from a keyboard, mouse, touch-sensitive surface, etc. Such input devices may be connected to the processor device 202 through the input device interface 222 coupled to the system bus 206 but can be connected through other interfaces such as a parallel port, an Institute of Electrical and Electronic Engineers (IEEE) 1394 serial port, a Universal Serial Bus (USB) port, an IR interface, and the like. The computer system 200 may include an output device interface 224 configured to forward output, such as to a display, a video display unit (e.g., a liquid crystal display (LCD) or a cathode ray tube (CRT)). The computing device 200 may also include a communications interface 226 suitable for communicating with a network as appropriate or desired.

The operational steps described in any of the exemplary embodiments herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

As described above, the vehicle comprises a propulsion motor 101 for propulsion. The propulsion motor 101 is activated, i.e., started, by manual actuation of a start actuator 320 arranged inside the cabin of the vehicle. Put it differently, when the operator of the vehicle 10 intends to start the propulsion motor 101 for taking off to the next assignment, he/she pushes the start actuator for a predetermined duration whereafter the propulsion motor 101 is started. As will be evident from the below disclosure with reference to FIGS. 3-5, the vehicle also comprises a driver seat sensor 302 and a door sensor 304. The driver seat sensor 302 is preferably arranged in the driver seat 306 and configured to determine a driver seat state 302', i.e., to detect if an operator is occupying the driver seat 306 or not. The door sensor 304 is preferably arranged on the driver side door 310, or on the pillar next to the driver side door 310. The door sensor 304 is configured to determine a driver door state 304', i.e., to detect if the driver side door 310 is open or closed. The driver seat sensor 302 as well as the door sensor 304 are both electrically connected to the above described control unit 202. Thus, the driver seat sensor 302 and the door sensor 304 transmit a respective signal (e.g., driver seat state data and door sensor state data) indicative of their status to the control unit 202.

The processing circuitry of the control unit 202, once receiving a signal from the driver seat sensor 302 indicative of the driver seat state, and receiving a signal from the door sensor 304 indicative of the driver door state, controls at least one auxiliary system of the vehicle according to a predetermined set of rules. In detail, and as will be evident from the below detailed description of FIGS. 3-5, different auxiliary systems of the vehicle are controlled based on if e.g., a driver is sitting on the driver seat or not, as well as based on if the door is open or closed.

Figure 3:
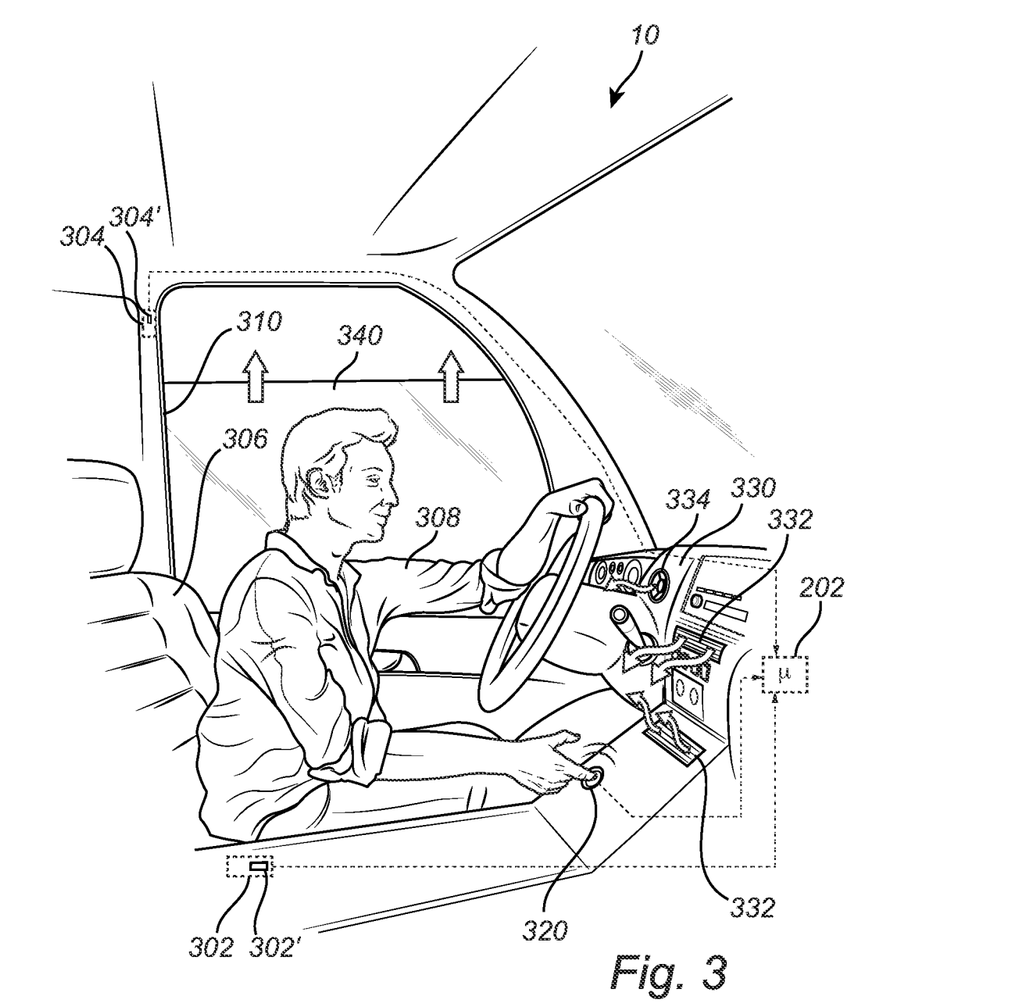
FIG. 3 is a view from inside the cabin of the FIG. 1 transportation vehicle when the auxiliary system is controlled according to a first predetermined rule.

Turning now to FIG. 3 which is a view from inside the cabin of the vehicle 10 when an auxiliary system of the vehicle 10 is controlled according to a first predetermined rule. As can be seen in FIG. 3, the operator 308 of the vehicle 10 is sitting on the driver seat 306 and applies a manual actuation of the start actuator 320. In addition, the driver side door 310 is closed. Hence, the driver seat sensor 302 transmits a signal to the processing circuitry indicative of the driver seat 306 being occupied, and the door sensor 304 transmits a signal to the processing circuitry indicative of the driver side door 310 being closed. As a result, the auxiliary system of the vehicle 10 should hereby be controlled according to the first predetermined rule.

Figure 4:
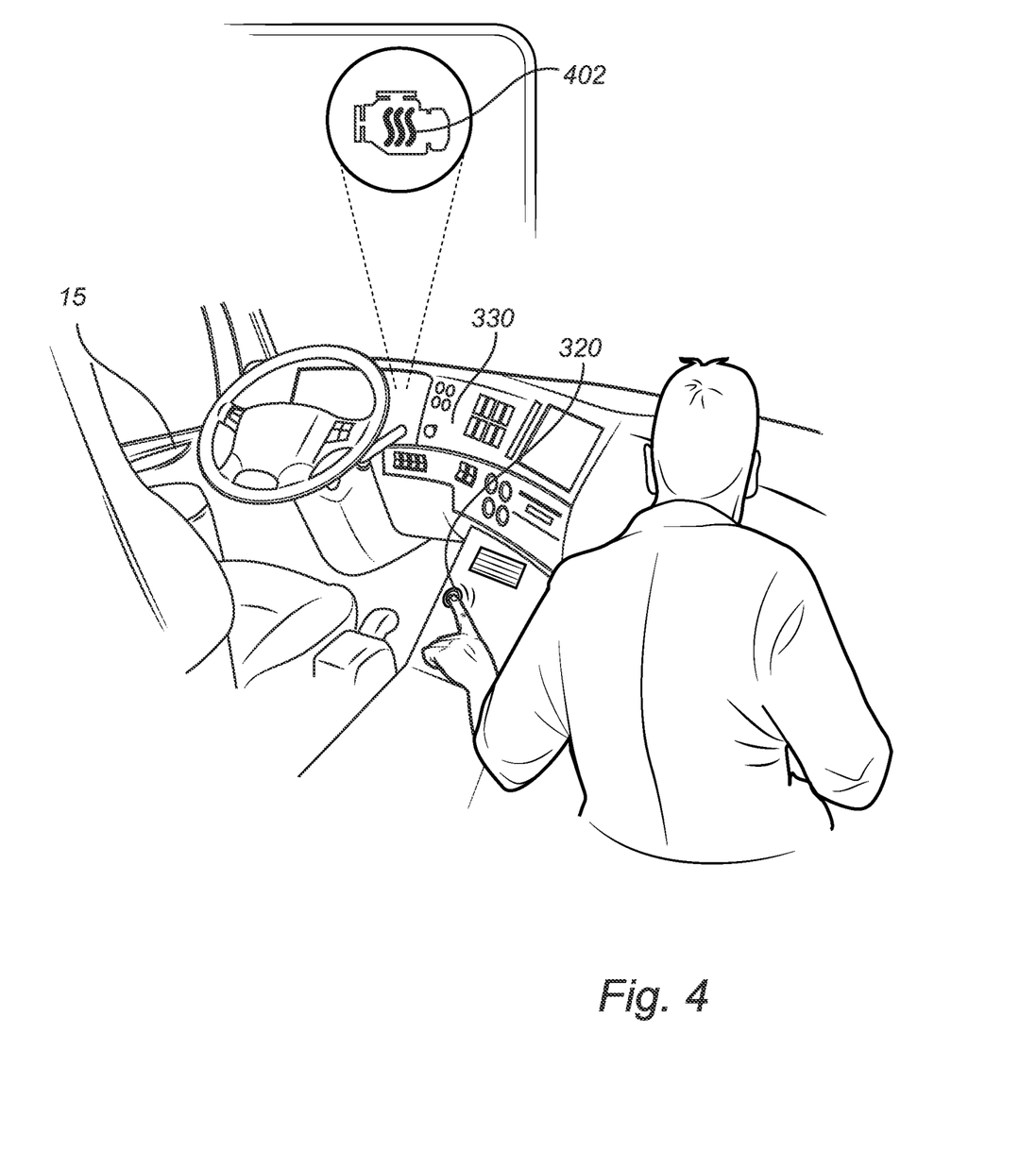
FIG. 4 is a view from inside the cabin of the FIG. 1 transportation vehicle when the auxiliary system is controlled according to a second predetermined rule.

With reference to FIG. 4, which is a view from inside the cabin 15 of the vehicle 10 when an auxiliary system of the vehicle 10 is controlled according to a second predetermined rule. As can be seen in FIG. 4, the operator 308 of the vehicle 10 is not sitting on the driver seat 306 and applies a manual actuation of the start actuator 320. Instead, the operator is sitting on the passenger seat when pushing the start actuator 320. In addition, the driver side door 310 is closed. Hence, the driver seat sensor 302 transmits a signal to the processing circuitry indicative of the driver seat 306 being un-occupied, and the door sensor 304 transmits a signal to the processing circuitry indicative of the driver side door 310 being closed. As a result, the auxiliary system of the vehicle 10 should hereby be controlled according to the second predetermined rule.

The auxiliary system in FIGS. 3 and 4 is a temperature control system 330 of the vehicle 10. The temperature control system 330 is preferably, although not depicted in the figures, connected to the control unit 202, whereby the processing circuitry of the control unit 202 controls operation of the temperature control system 330. The processing circuitry also preferably receives a signal indicative of an ambient temperature outside the vehicle, and controls the temperature control system 330 based on the ambient temperature when controlled according to the first and/or second predetermined rules.

In particular, when the ambient temperature is below a first predetermined threshold temperature limit, such as e.g., below 15 degrees Celsius, the temperature control system 330 is controlled according to the illustration of FIG. 4. As can be seen in FIG. 4, the temperature control system 330 comprises an engine and cabin heater 402. When the ambient temperature is below the predetermined threshold temperature limit and the temperature control system 330 is controlled according to the first and/or second predetermined rules, the processing circuitry controls the engine and cabin heater 302 to heat the propulsion motor of the vehicle and the vehicle cabin.

Again with reference to FIG. 3, the temperature control system 330 may also comprise a cabin ventilation system 332 for ventilating the cabin, and/or a cabin air conditioning system 334. The cabin ventilation system 332 and the cabin air conditioning system 334 are in FIG. 3 illustrated as the same component but should be construed as being different component provided behind the dashboard of the cabin.

When the ambient temperature is above the first predetermined temperature threshold limit, such as e.g., above 15 degrees Celsius, but still below a second predetermined temperature threshold, such as e.g., below 21 degrees, the cabin ventilation system 332 is controlled by the processing circuitry to ventilate the cabin of the vehicle.

When on the other hand the ambient temperature is also above the second predetermined temperature threshold limit, the cabin air conditioning system is controlled by the processing circuitry to air condition the cabin. In addition, the processing circuitry may also control open windows 340 of the vehicle to be closed when the ambient temperature is above the second predetermined threshold temperature limit.

It should be readily understood that the vehicle comprises the above described driver seat sensor 302, the door sensor 304 and the control unit 202 also for the example depicted in FIG. 4, although not explicitly illustrated therein.

Figure 5:
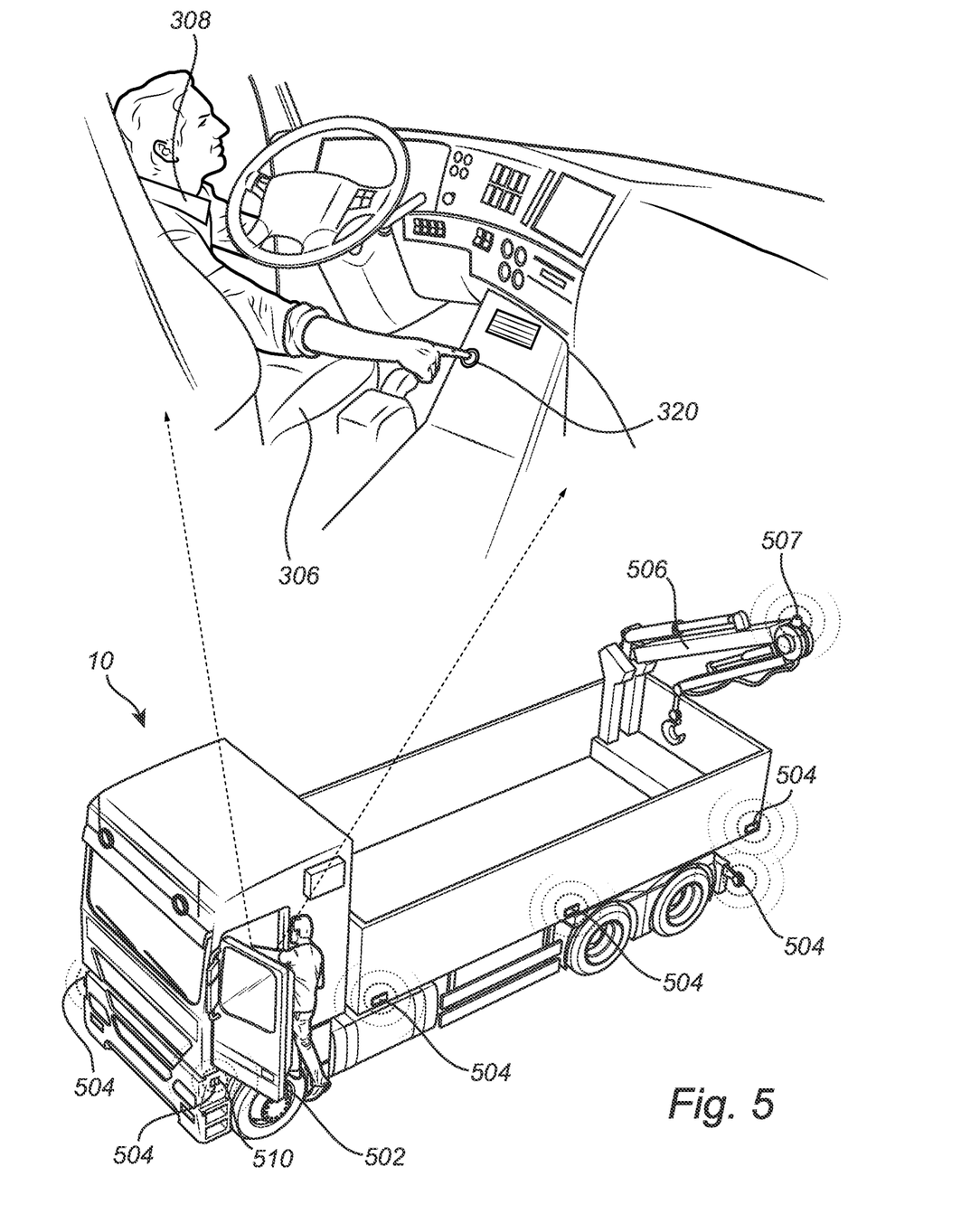
FIG. 5 is a view from outside the FIG. 1 transportation vehicle when the auxiliary system is controlled according to a third predetermined rule.

Reference is now made to FIG. 5 which is a view from inside the cabin as well as outside the vehicle 10 when an auxiliary system of the vehicle 10 is controlled according to a third predetermined rule. As can be seen in FIG. 5, the operator 308 of the vehicle 10 is not sitting on the driver seat 306 and applies a manual actuation of the start actuator 320. Instead, the operator is standing on the ladder 502 into the driving seat 306 when pushing the start actuator 320. In addition, the driver side door 310 is open. Hence, the driver seat sensor 302 transmits a signal to the processing circuitry indicative of the driver seat 306 being un-occupied, and the door sensor 304 transmits a signal to the processing circuitry indicative of the driver side door 310 being open. As a result, the auxiliary system of the vehicle 10 should hereby be controlled according to the third predetermined rule. Although the above described driver seat sensor 302, the door sensor 304 and the control unit 202 are not depicted in FIG. 5, it should be readily understood that these components also are present in the FIG. 5 example.

The auxiliary system in FIG. 5 is exemplified as comprising an external vehicle light system 504. The external vehicle light system 504 comprises at least one external vehicle light source 510. When the external vehicle light system 504 is controlled according to the third predetermined rule, the at least one external vehicle light source 510 is turned on, i.e., generates a light indication. Preferably, a pre-trip inspection of all external light sources can hereby be checked if functioning or malfunctioning. Preferably, the at least one external vehicle light source being a direction indicator lamp of the transportation vehicle which is controlled to emit a blinking light signal. The operator 308 can hereby inspect the external vehicle light system 504 to see that it functions properly.

The auxiliary system may also be a bodybuilder equipment 506. The bodybuilder equipment 506 is exemplified as a lift crane arranged at a rear end of the vehicle 10. The bodybuilder equipment 506 may, when controlled according to the third predetermined rule, be controlled by the processing circuitry when the operator pushes the start actuator 320. Hereby, the bodybuilder equipment 506 is activated, which is depicted as a blinking light indicator 507. The bodybuilder equipment 506 is hereby activated and ready for operation before the operator arrives at the rear end for further control thereof.

Figure 6:
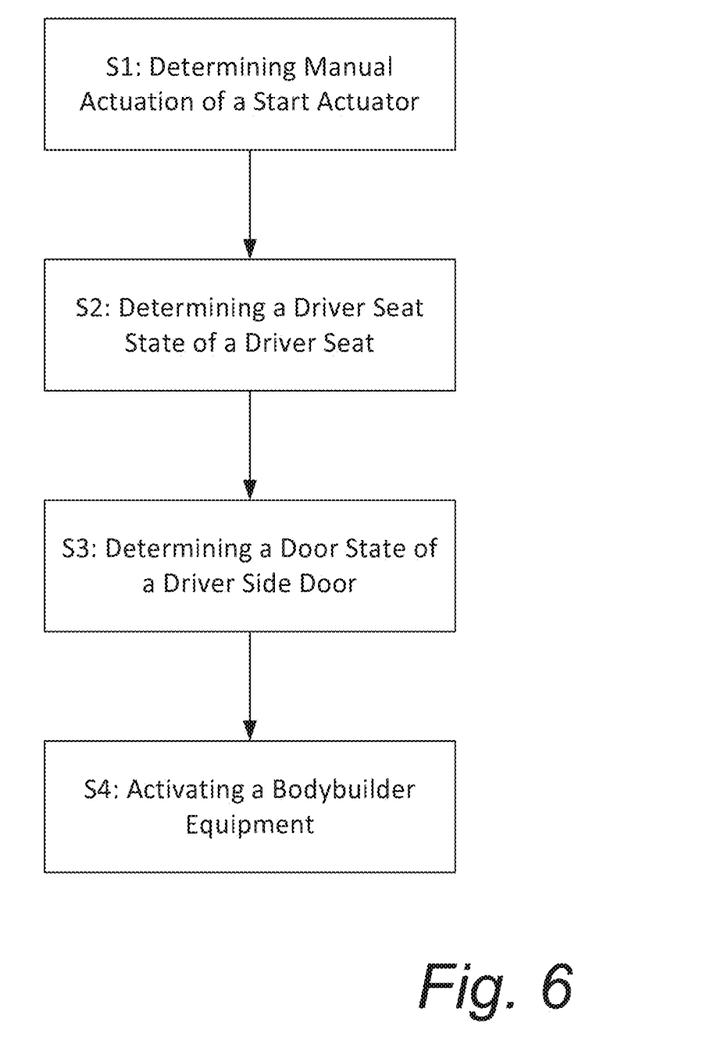
FIG. 6 is a flow chart of a method of controlling an auxiliary system according to an example.

In order to sum up, reference is now made to FIG. 6 which is a flow chart of a method of controlling an auxiliary system according to an example. When the operator 308 of the vehicle 10 pushes the start actuator 320 for a predetermined duration, the processing circuitry determines S1 that this manual actuation has taken place. The processing circuitry also determines S2 the driver seat state of a driver seat 306 of the vehicle 10 as being occupied or not occupied. In particular, the processing circuitry preferably receives a signal from the driver seat sensor 302 to determine if the operator is occupying the driver seat or not.

Moreover, the processing circuitry also determines S3 the door state of the driver side door 310 of the vehicle as being open or closed. Preferably, the processing circuitry receives a signal from the door sensor 304 to determine if the door 310 is open or closed. The auxiliary system is thereafter controlled according to a predetermined set of rules based on the driver seat state and the door state. According to the above described examples, the temperature control system, the external vehicle light system and/or the bodybuilder equipment is controlled based on which predetermined rule to implement.

It is to be understood that the present disclosure is not limited to the examples described above and illustrated in the drawings; rather, the skilled person will recognize that many changes and modifications may be made within the scope of the appended claims.

The invention claimed is:

1. A computer implemented method of controlling an auxiliary system of a transportation vehicle, the method comprising:
    determining, by a processing circuitry, manual actuation of a start actuator of the transportation vehicle for a predetermined duration;
    determining, by the processing circuitry, a driver seat state of a driver seat of the transportation vehicle;
    determining, by the processing circuitry, a door state of a driver side door of the transportation vehicle;
    activating, by the processing circuitry, a bodybuilder equipment of the auxiliary system based on the driver seat state of the driver seat not being occupied and the door state of the driver side door being open; and
    controlling, by the processing circuitry, the bodybuilder equipment to move from a non-activated configuration to an activated configuration.

2. The computer implemented method of claim 1, further comprising:
    determining, by the processing circuitry, an additional driver seat state of the driver seat, and an additional door state of the driver side door.

3. The computer implemented method of claim 2, further comprising:
    controlling, by the processing circuitry, the auxiliary system according to a first predetermined rule based on the additional driver seat state of the driver seat being occupied, and the additional door state of the driver side door being open or closed.

4. The computer implemented method of claim 3, further comprising:
    controlling, by the processing circuitry, the auxiliary system according to a second predetermined rule based on the additional driver seat state of the driver seat being not occupied, and the additional door state of the driver side door being closed.

5. The computer implemented method of claim 4, wherein the auxiliary system comprises a temperature control system of the transportation vehicle, the temperature control system being controlled based on an ambient temperature outside the transportation vehicle when controlled according to the first predetermined rule and/or the second predetermined rule.

6. The computer implemented method according to claim 5, wherein the temperature control system comprises an engine and cabin heater, the engine and cabin heater being controlled, by the processing circuitry, to heat a propulsion motor of the transportation vehicle and a cabin of the transportation vehicle when the ambient temperature is below a first predetermined threshold temperature limit.

7. The computer implemented method of claim 6, wherein the temperature control system comprises a cabin ventilation system for ventilating the cabin, the cabin ventilation system being controlled, by the processing circuitry, to ventilate the cabin of the transportation vehicle when the ambient temperature is above the first predetermined threshold temperature limit and below a second predetermined threshold temperature limit, wherein the second predetermined threshold temperature limit is higher than the first predetermined threshold temperature limit.

8. The computer implemented method of claim 7, wherein the temperature control system comprises a cabin air conditioning system, the cabin air conditioning system being controlled, by the processing circuitry, to air condition the cabin of the transportation vehicle when the ambient temperature is above the second predetermined threshold temperature limit.

9. The computer implemented method of claim 1, wherein the auxiliary system comprises an external vehicle light system of the transportation vehicle, the external vehicle light system comprising at least one external vehicle light source, the external vehicle light system being controlled, by the processing circuitry, to turn on the at least one external vehicle light source based on the driver seat state of the driver seat being not occupied and the door state of the driver side door being open.

10. A system for controlling an auxiliary system of a transportation vehicle, the system comprising a driver seat sensor, a door sensor, a manually actuatable start actuator, and a control unit comprising processing circuitry coupled to the driver seat sensor, the door sensor and the start actuator, the processing circuitry being configured to:
    receive a signal indicative of a manual actuation of the start actuator for a predetermined duration;
    receive a signal from the driver seat sensor, the signal being indicative of a driver seat state of a driver seat of the transportation vehicle;
    receive a signal from the door sensor, the signal being indicative of a driver door state of the driver side door of the transportation vehicle;
    activate a bodybuilder equipment of the auxiliary system based on the driver seat state of the driver seat being not occupied and the driver door state of the driver side door being open; and
    control, by the processing circuitry, the bodybuilder equipment to move from an non-activated configuration to an activated configuration.

11. A transportation vehicle comprising the system of claim 10.

12. A computer program product comprising a non-transitory computer readable medium having stored thereon a computer program comprising instructions for performing the method of claim 1 when the computer program is run on a computer.

13. A control unit for controlling an auxiliary system of a transportation vehicle, the control unit being configured to perform the method of claim 1.

14. A system for controlling an auxiliary system of a transportation vehicle, the system comprising a driver seat sensor, a door sensor, a manually actuatable start actuator, and a control unit comprising processing circuitry coupled to the driver seat sensor, the door sensor and the start actuator, the processing circuitry being configured to:
  receive a signal indicative of a manual actuation of the start actuator for a predetermined duration;
  receive a signal from the driver seat sensor, the signal being indicative of a driver seat state of a driver seat of the transportation vehicle;
  receive a signal from the door sensor, the signal being indicative of a driver door state of the driver side door of the transportation vehicle;
  activate a bodybuilder equipment of the auxiliary system based on the driver seat state of the driver seat being not occupied and the driver door state of the driver side door being open;
  determining, by the processing circuitry, an additional driver seat state of the driver seat, and an additional door state of the driver side door;
  controlling, by the processing circuitry, the auxiliary system according to a first predetermined rule based on the additional driver seat state of the driver seat being occupied, and the additional door state of the driver side door being open or closed; and
  controlling, by the processing circuitry, the auxiliary system according to a second predetermined rule based on the additional driver seat state of the driver seat being not occupied, and the additional door state of the driver side door being closed,
  wherein the auxiliary system comprises a temperature control system of the transportation vehicle, the temperature control system being controlled based on an ambient temperature outside the transportation vehicle when controlled according to the first predetermined rule and/or the second predetermined rule.

* * * * *